Dec. 21, 1926. 1,611,303
C. BRANTS
STOCK FEEDER
Filed August 13, 1925  2 Sheets-Sheet 2
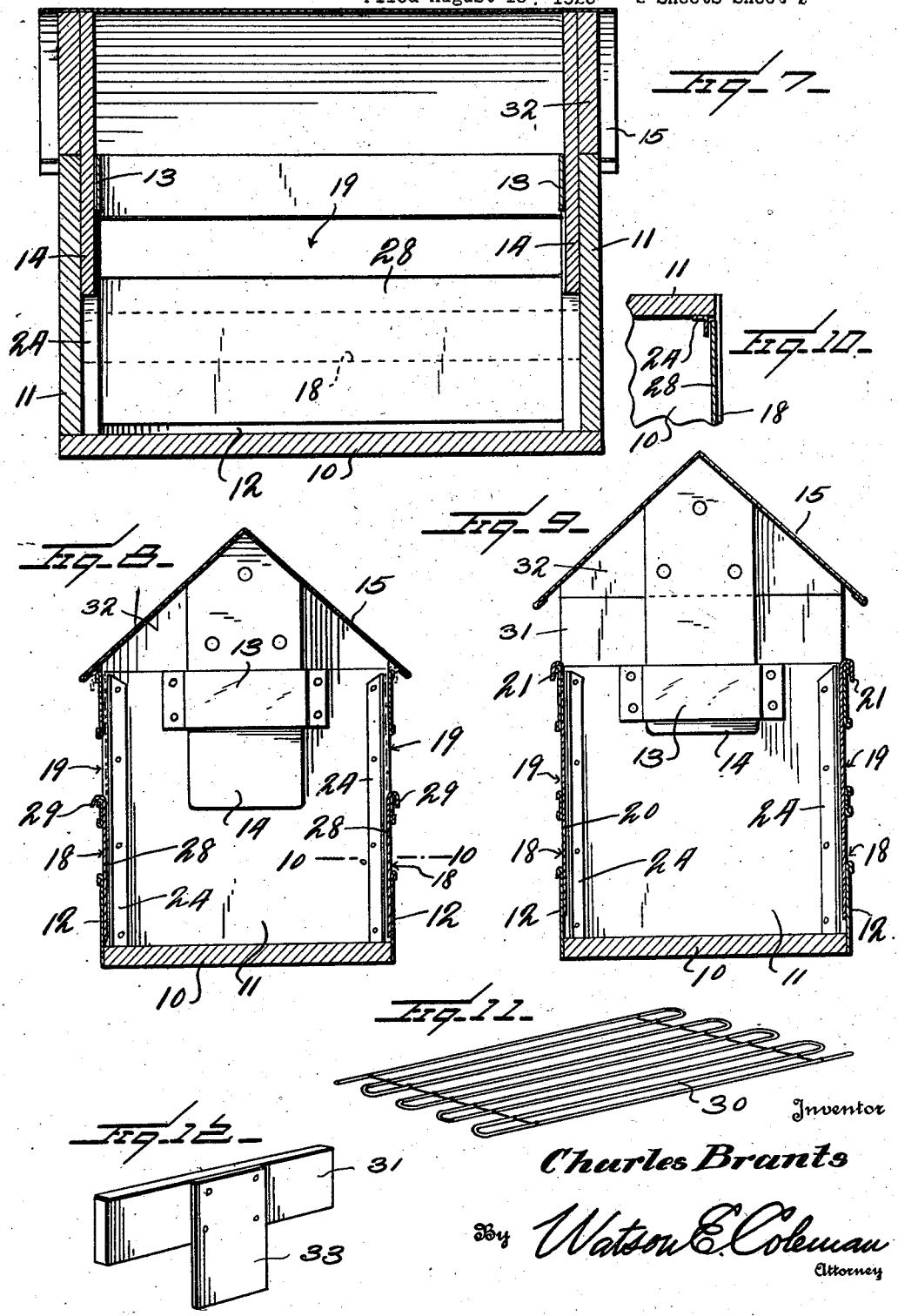

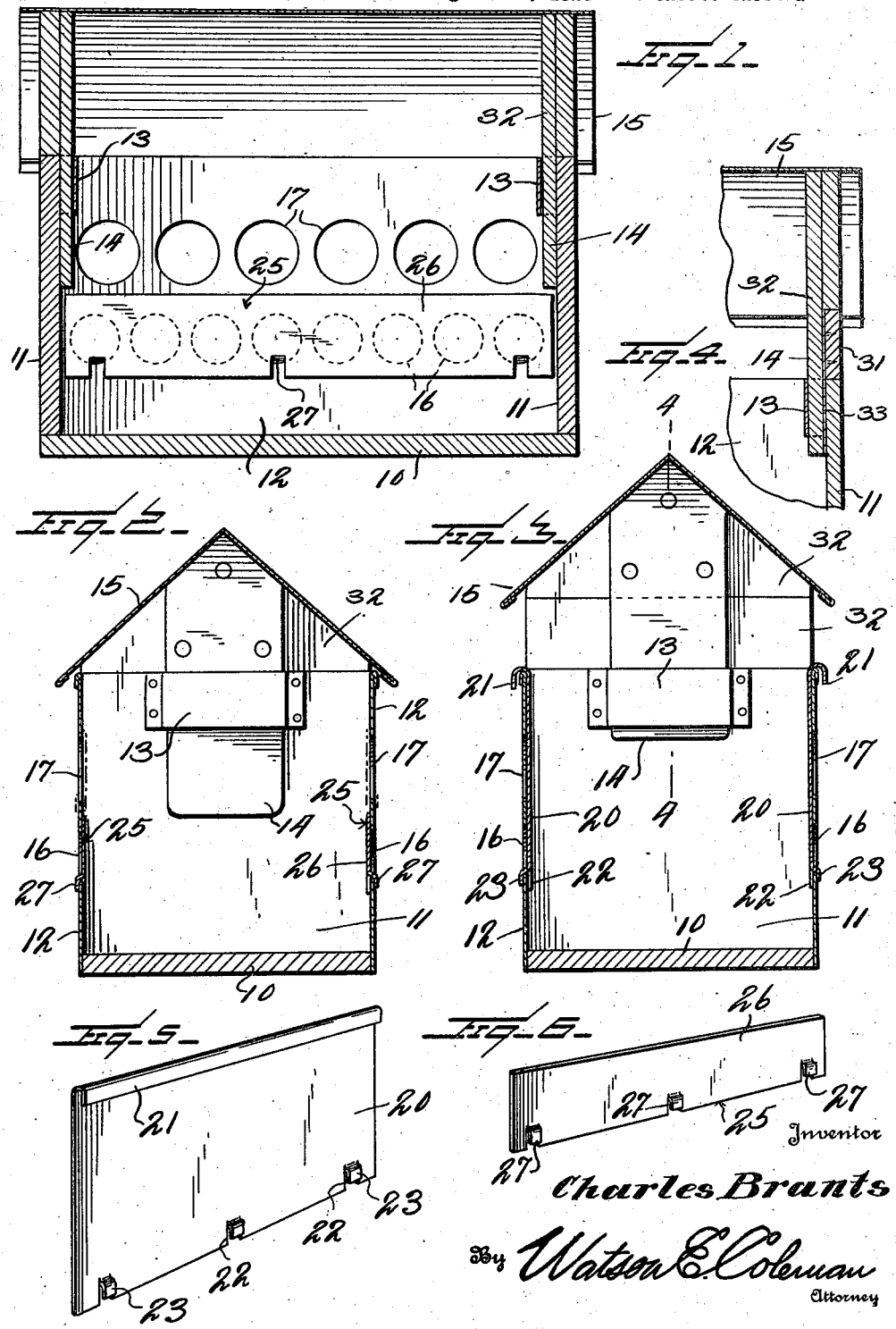

Patented Dec. 21, 1926.

1,611,303

UNITED STATES PATENT OFFICE.

CHARLES BRANTS, OF YORKTOWN, ILLINOIS.

STOCK FEEDER.

Application filed August 13, 1925. Serial No. 50,061.

This invention relates to stock feeders and more particularly to a stock feeder capable of use for feeding either young, half grown or old fowls or animals and having means for rendering it inoperative to feed either class of stock when it is in use for the other class.

A further object of the invention is the provision of a device of this character in which changes may be very readily effected and which may be produced at a very low cost.

A further and more specific object of the invention is to produce a hopper having formed in the walls thereof openings through which young stock may feed and other openings through which half grown stock may feed and a single element for association with the walls and interchangeably mounted thereon for closing either of the openings.

A further object of the invention is to provide a device of this character wherein the side walls are of such height that young or half grown chicks cannot feed thereover together with a cover which may be so positioned that the feed is not accessible over these side walls or that it is accessible so that by closing both groups of openings in the side walls and shifting the cover to the last named position, fully grown stock alone may be fed.

The invention further resides in the details of construction and in the combination and arrangement of the various parts, as shown in the accompanying drawings, wherein:—

Figure 1 is a vertical sectional view through a feeder constructed in accordance with my invention;

Figure 2 is a transverse sectional view therethrough, the feeder being shown as arranged for feeding half grown stock;

Figure 3 is a similar view showing the feeder arranged for feeding full grown stock;

Figure 4 is a section on the line 4—4 of Figure 3;

Figure 5 is a perspective of the slide used when the feeder is to be employed for full grown stock;

Figure 6 is a similar perspective of the slide employed when the feeder is used for either young or half grown stock;

Figure 7 is a vertical sectional view through a modified form of the feeder;

Figure 8 is a transverse sectional view through the form of feeder shown in Figure 7 in use for feeding half grown stock;

Figure 9 is a similar view with the feeder in use for full grown stock;

Figure 10 is a section on the line 10—10 of Figure 8;

Figure 11 is a perspective view of the follower;

Figure 12 is a perspective view of the top support employed when either type of feeder is used with full grown stock.

Referring now more particularly to the drawings, the stock feeder illustrated is particularly adapted for feeding fowls and has a bottom 10, end walls 11 and side walls 12. The end walls 11 have guides 13 for the reception of slides 14 mounted on a removable top or cover 15. As will hereinafter become obvious, it is necessary that this cover be very readily removable both to facilitate filling of the feeder and to facilitate changing of the control elements, hereinafter to be more fully described.

The side walls each have openings formed therein arranged at different heights, the lower or smaller openings being employed when the young stock is being fed and the upper or larger openings being employed when half grown stock is being fed. These openings, because of their arrangement, will prevent mixed feeding of the two grades of stock due to the fact that the half grown stock will be unable to feed through the restricted openings provided for the young stock while the young stock will be unable to reach the feed through the upper larger openings through which the large stock may be fed. These openings may be formed in any suitable manner. In Figures 1, 2 and 3, the openings are shown as formed by punching the same through the metallic walls of the container, the lower openings 16 being very small and of a size just sufficient to permit entrance of the heads of young chicks while the upper series of openings 17 are arranged above the height accessible to younger chicks and are made considerably larger to admit the heads of large stock. In the form shown in Figures 7, 8 and 9, the walls are simply longitudinally slotted, as at 18 and 19 to provide these openings.

With each of the forms above described, I provide a closure slide 20 of a length equal to the distance between the end walls 11 and of a height slightly greater than the distance between the lower edge of the lower openings 16 or 18 and the upper edge of the side walls 12. In each case, the upper end of the slides 20 is reverted in spaced relation to the slide, as indicated at 21, so that it may be hooked over the upper edge of the side wall and the upper end of the slide thus held from movement.

In each instance, some means are provided for preventing movement of the lower edge of the slide. Where the openings 16, 17 are provided, the lower end of the slide is slit at spaced intervals, as indicated at 22, in Figures 5 and 6, to provide tongues 23. These tongues are then offset for the thickness of the metal so that they may extend through the opening 16 when the slide is arranged upon the inner surface of the wall 12 and prevent inward movement of the lower end of the slide. The tongues 23 will, of course, be spaced to correspond to the spacing of the openings and will preferably be three in number, one arranged at the center of the slide and the two remaining arranged adjacent the ends of the slide. When the openings 18, 19 are employed, a device of the character just described may obviously be employed, but I prefer that the slide in this instance be held at its lower end against movement by means of angle iron guides 24 secured to the end walls 11 in sufficiently spaced relation to the sides 12 to admit the slide 20. With this structure, the slide is, of course, reinforced throughout its height.

In order that either set of openings may be individually closed, I provide supplemental slides 25 for coaction with the openings 16, 17. These slides preferably consist of a strip of metal 26, the lower edge of which is provided with offset tongues 27 similar in construction to the tongues 23, hereinbefore described in connection with the slide 20. These tongues will coact with either openings 16 or 17, certain of these openings aligning for engagement by the tongues. With this construction, the supplemental slide 25 simply flatly abuts the inner face of the side wall 12 and is held in position solely by the tongues 27. While a supplemental slide of this character may quite obviously be employed for closing the openings 18 and 19, I prefer the construction illustrated in Figures 7, 8 and 9 wherein the supplemental slide consists of a strip of metal 28 of a length slightly greater in width than the distance from the top of the side wall to the lower edge of the larger opening 19, the strip having at its upper edge a hook 29 for overhanging either the upper edge of the side wall or the lower edge of the opening 19. In inserting this strip in the opening 19, it is inserted from the outside through the opening and then slid downwardly until it closes the opening 18 and rests upon the lower edge of the opening 19. These strips 28 will be of the same length as the inner length of the feeder.

It will be obvious that at any time it is desired to discontinue use of the feeder, the slides 20 may be employed. If only half grown chicks are to be fed, the supplemental slides 25 may be employed to close the openings 16, 18, as the case may be and if the younger stock is to be fed to close the openings 17 or 19. It will furthermore be obvious that the interior construction of the feeder may be arranged to suit the desires of the builder or user. For example, a movable batten 30 may be arranged upon the feed to prevent scattering it.

In order that full grown stock may be fed, I provide means for so elevating the cover 15 that the space between the sides of the cover and the upper edges of the side walls is sufficient to admit the heads of full grown stock. This means comprises a spacing block 31 adapted to seat upon the upper ends of the side walls 11 and between the upper ends of the side walls and the end walls 32 of the top 15. These spacing blocks have attached thereto a thin metal slide 33 which may be engaged in the guides 13 simultaneously with the slides 14 of the cover, as more particularly shown in the detail sectional view of Figure 4. At this time it will, of course, be understood that the feeder will have applied thereto the slides 20 for closing both sets of openings in the side walls thereof. With the spacing blocks 31 removed and the slides 20 in position, the feeder is, of course, closed to all types of stock.

Other changes being possible in the construction hereinbefore set forth without departing from the spirit of the invention, I do not limit myself to such specific structure except as hereinafter claimed.

I claim:—

1. In combination with a hopper having vertically spaced openings of different sizes formed in the walls thereof, a slide engageable with and adapted to be supported from the wall of the hopper for closing either of said openings, said slide being engaged against one face of the wall of the hopper and having at its lower edge an offset tongue adapted to extend through the opening and engage the opposite side of the wall thereof.

2. A hopper having side and end walls, a top having end walls normally engaging the upper ends of the end wall of the hopper, said top, when in normal position, extending closely adjacent the upper ends of the side walls of the hopper, means insertible between the end walls of the hopper and cover for maintaining the cover in spaced relation to the side walls of the hopper to thereby afford access thereto and means for maintaining the cover in proper covering relation to the hopper in either of said positions comprising slides carried by the cover and extending into guides carried by the end walls of the hopper, the first named means comprising spacing blocks, said spacing blocks each having a slide engageable in the guides of the end walls simultaneously with the slides of the cover.

3. In combination with a hopper having vertically spaced openings of different sizes formed in the walls thereof, a slide engageable with and adapted to be supported from the wall of the hopper for closing said openings, said slide being engaged against one face of one wall of the hopper and having at its lower edge an offset tongue adapted to extend through the opening and engage the opposite side of the wall thereof.

In testimony whereof I hereunto affix my signature.

CHARLES BRANTS.